UNITED STATES PATENT OFFICE.

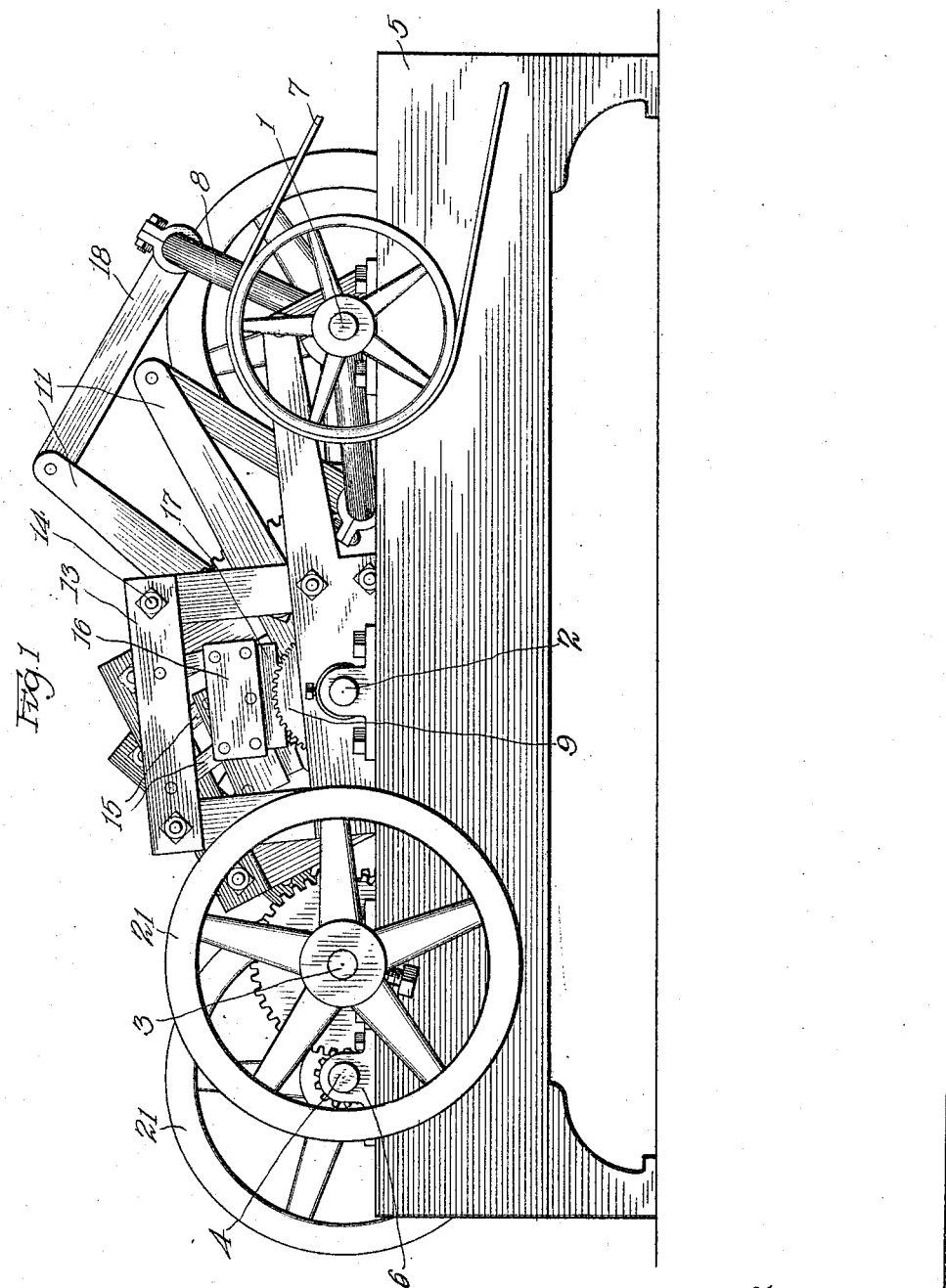

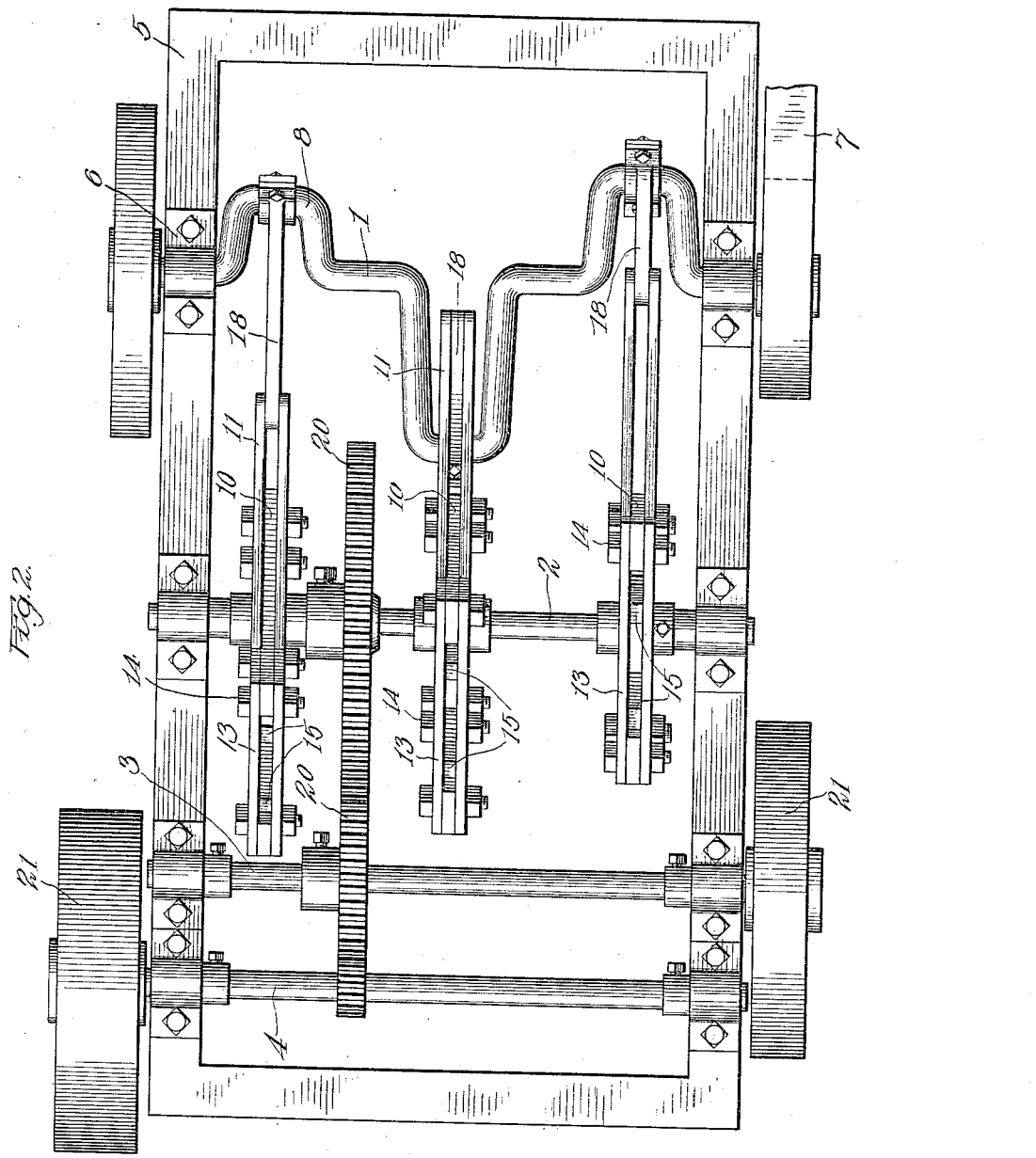

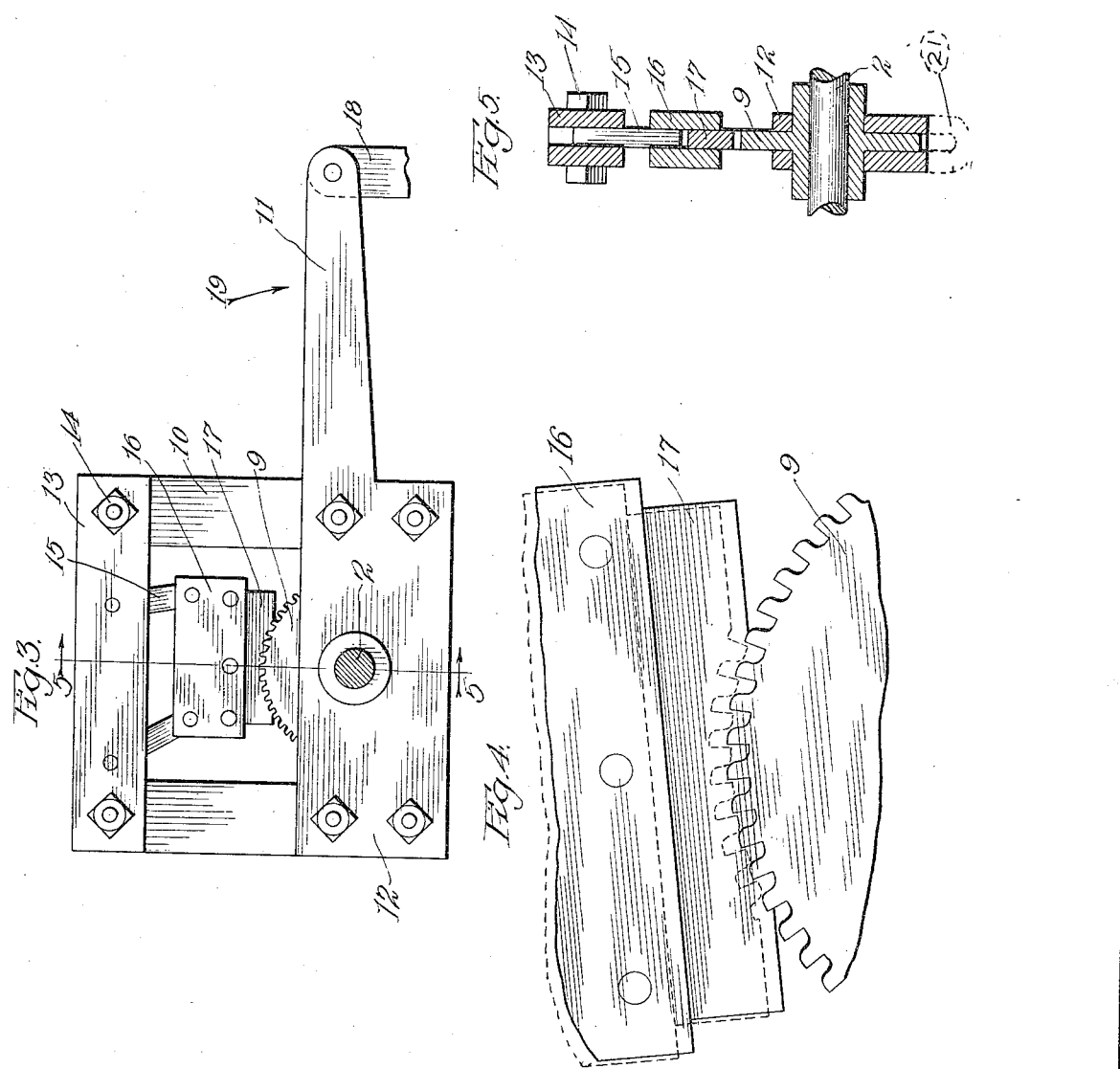

JOHN WILLIAM MATTHEWS, OF OREGON, ILLINOIS.

POWER-TRANSMISSION MECHANISM.

1,150,446.  Specification of Letters Patent.  Patented Aug. 17, 1915.

Application filed August 19, 1914, Serial No. 857,474. Renewed July 3, 1915. Serial No. 37,954.

*To all whom it may concern:*

Be it known that I, JOHN WILLIAM MATTHEWS, citizen of the United States, residing at Oregon, in the county of Ogle and State of Illinois, have invented certain new and useful Improvements in Power-Transmission Mechanism; and I do hereby declare the following to be a full, clear, and exact description of the invention, such as will enable others skilled in the art to which it appertains to make and use the same.

My invention relates to power transmission mechanism and more particularly to means for transmitting power from one shaft to another in such a way as to impart to the driven shaft a torque greater than that imparted to the driving shaft by the source of energy operating the latter.

Another and more specific object of my invention is to provide simple and effective means for successively imparting rotation to a driven shaft from a number of cranks carried by a driving shaft.

While the mechanism of my invention may be applied for many different purposes, its general operations should be apparent from the accompanying drawings which show my mechanism as transmitting power from a driving shaft 1 to a driven shaft 2 and to auxiliary shafts 3 and 4 connected by gearing to the shaft 2, all of said shafts being supported by a common frame 5.

In the drawings, Figure 1 is a side elevation of such a mechanism. Fig. 2 is a plan view of the same. Fig. 3 is an enlarged view showing the means of imparting rotation from one of the oscillating members of the mechanism to one of the toothed wheels carried by the driven shaft. Fig. 4 is an enlarged fragmentary view of one of the said toothed wheels and of the toothed member in engagement therewith. Fig. 5 is a transverse section through Fig. 3 along the line 5—5.

In the drawings, the mechanism embodying my invention includes the four shafts 1, 2, 3 and 4 mounted in suitable bearings 6 upon a frame 5, power being imparted to the driving shaft 1 through a belt 7 from any suitable source of power. Formed upon the driving shaft 1 are three cranks 8 spaced respectively one hundred and twenty degrees apart about the axis of the said shaft. Mounted upon the driven shaft 2 and rigidly secured thereto in alinement with the respective cranks 8 are three toothed wheels 9, which wheels have teeth disposed substantially radially upon one edge, the tip of each radial edge being joined to the bottom of the radial edge of the next teeth by a reverse curve as shown in Fig. 4. Loosely mounted upon the driven shaft 2 adjacent to each of the said toothed wheels 9 are three frames 10 each equipped with an extension arm 11 by means of which the said frames can be oscillated about the axis of the shaft 2. The frames 10 may be constructed in a variety of ways, but are shown in the drawings as consisting of two lower plates 12 connected by risers to a pair of upper plates 13, which latter are spaced at some distance from each other and are connected to the said uprights through suitable fastening means such as the bolts 14. Suspended within each of the said frames 10, as by a pair of links 15 pivoted to the upper frame members 13, is a latching member comprising a pair of plates 16 having clamped between them a toothed plate 17, which toothed plate is equipped with teeth corresponding to those upon a portion of the periphery of the adjacent toothed wheel 9. The extension arm 11 of each of the said frames is connected by a pitman 18 to the adjacent crank 8, so that the rotation of the said crank will operate through the said pitman to oscillate the frame. The latching member 16 is preferably so positioned (as shown in Fig. 3) that gravity will tend to move it about the links 15 by which it is suspended so as to bring the center of gravity of the said latching member to the opposite side of the shaft 2 from the extension 11. In other words, if the driving shaft 1 is at the forward end of the mechanism, gravity will continuously tend to swing the latch member 16 rearwardly of the mechanism.

When the driving shaft 1 is rotated with the mechanism arranged as above described, the cranks 8 will successively occupy the positions indicated for each one separately in Fig. 2, thereby causing the oscillating arms 11 and the frames carrying the latter successively to occupy various positions as shown in Fig. 1. In doing so, each crank will move the arm 11 connected thereto successively in a clockwise and a counter-clockwise direction. When moved in a clockwise direction, as shown by the arrow 19 in Fig. 3, the relative position of the links 15 and the frame carrying the same with respect to the toothed wheels 9 will cause the teeth of the latching member to interlock with adjacent teeth of the wheel 9, thereby imparting a rotary motion to the toothed wheel and to the driven shaft 2 upon which the said wheel is rigidly mounted. In so doing, the radial dispositon of the forward edges of the teeth on the latching member and of the rear edges of the teeth on the toothed wheel will enable a large number of the said teeth to interlock at the same time, thereby permitting a considerable amount of power to be transmitted without a slipping of the teeth. However, when the oscillating frame has reached the end of its travel in one direction and is reversed as to its motion, the rounding of the forward edges of the toothed wheel and of the rear edges of the teeth on the latching member will permit the teeth on the latter to ride freely out of their interlocking engagement with the teeth of the toothed wheel, as shown by dotted lines in Fig. 4. Consequently, such a reversing of the oscillation of the frame will not interfere with the continuous rotation of the adjacent toothed wheel 9 and of the shaft 2 in the direction in which the said shaft has been impelled by the previous motion of the same member. Moreover, the rotationally staggered relation of the respective shafts 8 will cause the various frames to oscillate successively, so that the impulses imparted by them to the driving shaft will follow in rythmical succession, thereby enabling me to impart a steady driving motion to the driven shaft 2.

It will be evident that by suitably proportioning the relative sizes of the toothed wheels 9 and the cranks 8, and also by equipping each oscillating frame with an operating arm or lever 11 many times longer than the radius of the toothed wheel 9, I can impart to the driven shaft a torque many times greater than that applied to each crank by the rotation of the driving shaft. Then if the resulting speed of the driven shaft 2 is not suitable for the purposes intended, the said speed may be increased by connecting the driven shaft 2 to the other shafts 3 or 4 through suitably proportioned gears 20. Also, I may equip at least one of the shafts 3 or 4 with a flywheel 21 as a further means of steadying the motion imparted through successive impulses to the driven shaft 2. To insure a proper lubrication of the contacting teeth of the wheels 9 and of the latching member, the lower edge of each toothed wheel may be run through a lubricant contained in a trough 22 carried by the plates 12 of the adjacent oscillating member. However, I do not wish to be limited to this particular arrangement, nor to other details as herein disclosed, as it will be evident that both these details and the entire embodiment might be varied in many ways without departing from the spirit of my invention.

I claim as my invention:

1. Power transmission mechanism including a driving shaft, a driven shaft, a plurality of toothed wheels carried by the driven shaft, an equal number of frames pivoted upon the driven shaft respectively adjacent to each of said toothed wheels, a pair of links carried by each frame, a latching member suspended by said links and equipped with teeth adapted to interlock simultaneously with a plurality of teeth of the wheel adjacent thereto, and means associated with said driving shaft to oscillate said frames out of unison with each other.

2. Power transmission mechanism including a driving shaft, a driven shaft, a plurality of toothed wheels carried by the driven shaft, an equal number of frames pivoted upon the driven shaft respectively adjacent to each of said toothed wheels, a pair of links carried by each frame, a latching member suspended by said links and equipped with teeth adapted to interlock simultaneously with a plurality of the teeth of the wheel adjacent thereto, and means associated with said driving shaft to oscillate said frames out of unison with each other, the teeth of each wheel and of the adjacent latching member engaged thereby being equipped with engaging surfaces contacting for substantially the entire height of each tooth when the said wheel and latching member are interlocked.

3. Power transmission mechanism including a driving shaft, a driven shaft, a plurality of toothed wheels carried by the driven shaft, an equal number of frames pivoted upon the driven shaft respectively adjacent to each of said toothed wheels, a pair of links carried by each frame, a latching member suspended by said links and equipped with teeth adapted to interlock simultaneously with a plurality of the teeth of the wheel adjacent thereto, and means associated with said driving shaft to oscillate said frames out of unison with each other, the teeth of each wheel and of the adjacent latching member engaged thereby being equipped with engaging surfaces contacting for substantially the entire height of each tooth when the said wheel and latching member are interlocked, the teeth of each wheel and of the latching member adjacent thereto being equipped on the sides opposite their said engaging surfaces with rounded faces adapted to ride upon each other so as to guide said teeth out of their respective engagement when the latching member is being swung out of its interlocking position.

4. Power transmission mechanism including a driving shaft, a driven shaft, a plurality of toothed wheels carried by the driven shaft, an equal number of frames pivoted upon the driven shaft respectively adjacent to each of said toothed wheels, each of said frames having an upper portion parallel to the axis thereof, a latching member interposed between said upper frame portion and the toothed wheel adjacent thereto, and a pair of links connecting the latching member with said frame portion, said links being so disposed with respect to the shaft that the center of gravity of said latching member will tend to gravitate to the opposite side of the driven shaft from the driving shaft.

5. Power transmission mechanism including a driving shaft, a driven shaft, a plurality of toothed wheels carried by the driven shaft, an equal number of frames pivoted upon the driven shaft respectively adjacent to each of said toothed wheels, each of said frames having an upper portion parallel to the axis thereof; a latching member interposed between said upper frame portion and the toothed wheel adjacent thereto, said latching member being equipped with a plurality of teeth adapted simultaneously to engage teeth of said toothed wheel; and a pair of links connecting the latching member with said frame portion, said links and said teeth relatively so disposed as to coact when the teeth are interlocked to cause the links to hold said teeth firmly interengaged.

In testimony whereof I have signed my name in presence of two subscribing witnesses.

JOHN WILLIAM MATTHEWS.

Witnesses:
C. F. JONES,
CHARLES JACOBSEN.

Copies of this patent may be obtained for five cents each, by addressing the "Commissioner of Patents. Washington, D. C."